(12) United States Patent
Kainuma et al.

(10) Patent No.: US 6,694,255 B1
(45) Date of Patent: Feb. 17, 2004

(54) NAVIGATION SYSTEM AND STORAGE MEDIUM

(75) Inventors: Mamoru Kainuma, Anjo (JP);
Yasuhiro Tooyama, Anjo (JP);
Hidenobu Suzuki, Toyota (JP);
Hironobu Sugimoto, Toyota (JP);
Hidetoshi Fujimoto, Kariya (JP);
Masahiro Kimura, Kariya (JP);
Hiroshi Takeuchi, Kobe (JP); Atsushi Ichimura, Kobe (JP); Isao Ogawa, Yokohama (JP)

(73) Assignees: Aisin AW Co., Ltd., Anjo (JP); Toyota Jidosha Kabushiki Kaisha, Toyota (JP); Denso Corporation, Kariya (JP); Fujitsu Ten Limited, Kobe (JP); Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/576,216

(22) Filed: May 23, 2000

(30) Foreign Application Priority Data

May 24, 1999 (JP) .......................................... 11/143656

(51) Int. Cl.$^7$ .............................................. G01C 21/00
(52) U.S. Cl. ...................................... 701/209; 701/211
(58) Field of Search ................................ 701/207, 208, 701/209, 210, 211; 340/988, 990, 995; 73/178 R (56) References Cited

U.S. PATENT DOCUMENTS

| | | | | |
|---|---|---|---|---|
| 4,963,865 A | * | 10/1990 | Ichikawa et al. | 340/995 |
| 5,638,279 A | * | 6/1997 | Kishi et al. | 701/211 |
| 5,787,383 A | * | 7/1998 | Moroto et al. | 701/210 |
| 5,874,905 A | * | 2/1999 | Nanba et al. | 340/995 |
| 5,913,918 A | * | 6/1999 | Nakano et al. | 701/208 |
| 5,974,876 A | * | 11/1999 | Hijikata et al. | 701/210 |
| 5,983,158 A | * | 11/1999 | Suzuki et al. | 701/209 |
| 6,035,253 A | * | 3/2000 | Hayashi et al. | 701/211 |

FOREIGN PATENT DOCUMENTS

| | | |
|---|---|---|
| DE | 0 702 209 A1 | 3/1996 |
| DE | 0 767 448 A1 | 4/1997 |
| DE | 0 777 206 A1 | 6/1997 |
| DE | 0 836 167 A1 | 4/1998 |

* cited by examiner

*Primary Examiner*—Yonel Beaulieu
(74) *Attorney, Agent, or Firm*—Oliff & Berridge, PLC

(57) ABSTRACT

Branch-point image data has coordinates added thereto according to the distance from a branch point such as an intersection. When the vehicle is within a predetermined distance from a branch point on a suggested route, the coordinates of the present position of the vehicle and the coordinates added to the branch-point image data are compared to locate the present position on the image data, and a present-position mark is displayed superimposed on the branch-point image data. The displayed present-position mark moves according to the distance between the vehicle and the branch point.

6 Claims, 8 Drawing Sheets

| (50, 0) |
|---|
| (50, 25) |
| (50, 40) |
| (50, 50) |

NAVIGATION SYSTEM AND STORAGE MEDIUM

The entire disclosure of Japanese Application No. JP-11-143656 filed on May 24, 1999 including specification, claims, drawing and summary are incorporated herein be reference in its entirety.

BACKGROUND OF THE INVENTION

The present invention relates to a navigation system arranged to display an enlarged view of a branch-point image by using image data when the vehicle is within a predetermined distance from a branch point such as an intersection on a suggested route. The present invention also relates to a storage medium having a program for executing the above-described display processing.

Figure 9:
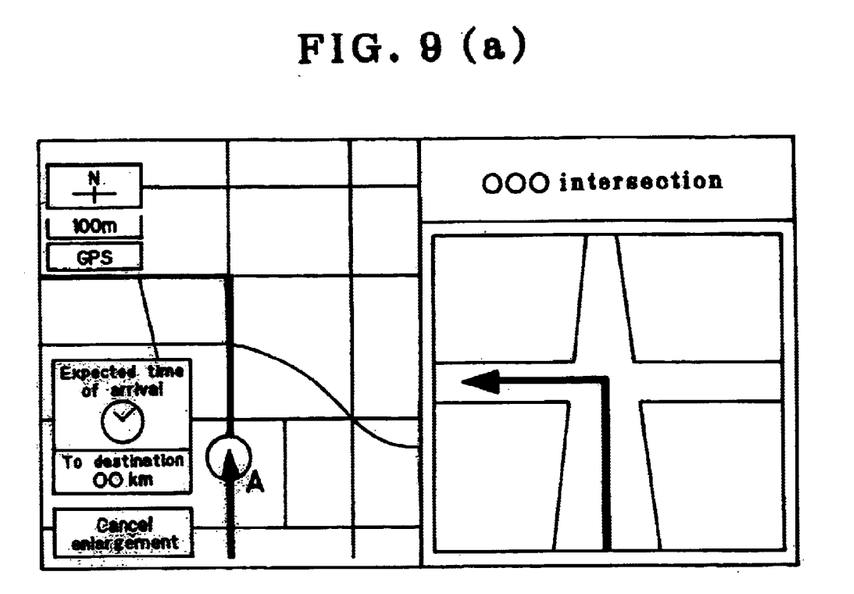
FIGS. 9(a)–9(b) are diagrams showing a display example of an enlarged view of an image displayed by using image data according to the prior art.

A typical navigation system for vehicles searches, upon entry of a destination and a transit point, for a route to the destination and guides the vehicle to the destination. There is known a navigation system arranged such that when the vehicle is within a predetermined distance from an intersection on a suggested route at which the driver should turn, the navigation system displays an enlarged view of the intersection prepared from road node data or displays image data concerning the intersection that has been stored in advance. FIG. 9 shows an enlarged view of an intersection and an enlarged view of a branch point, which are displayed by such a conventional navigation system. Thus, an ordinary map prepared from road node data is displayed on the left-hand part of a two-part split screen, and an enlarged view of a branch point drawn by using image data is displayed on the right-hand part of the two-part split screen. On the map prepared from the node data on the left-hand part, a mark A indicating the present position of the vehicle is shown. On the right-hand part displaying the image data, only a direction in which the vehicle should advance is shown, but the present position of the vehicle is not displayed.

An enlarged view of an intersection prepared from road node data has coordinates as position information concerning nodes. Therefore, a mark indicating the present position of the vehicle can be displayed so as to move according to the distance between the vehicle and the intersection. In an enlarged view of an intersection drawn by using image data, however, because the image data has no coordinates, a present-position mark cannot be displayed nor moved according to the distance between the vehicle and the intersection. Therefore, with an enlarged view of an intersection displayed by using image data, the user cannot ascertain the present position of the vehicle at the intersection and may mistakenly turn at an intersection adjacent to the suggested intersection or pass the intersection at which he or she should turn.

SUMMARY OF THE INVENTION

In view of the above-described problems, an object of the present invention is to provide a navigation system of the type wherein an enlarged view of a branch point such as an intersection is displayed by using image data, which is designed so that a present-position mark can be displayed superimposed on the image data and the present-position mark thus displayed can be moved according to the distance between the present position and the branch point.

To attain the above-described object, the present invention provides a navigation system including a present-position detecting unit for detecting the present position of a vehicle and an input unit for entering a destination and information necessary for a route search. An information storage unit stores data necessary for a route search. The data includes branch-point image data having coordinates added thereto according to the distance from a branch point, such as an intersection, and road data. A display unit displays route guidance information. A route search unit searches for a route to the destination on the basis of the information entered by the input unit and the data stored in the information storage unit. A control unit reads the branch-point image data when the vehicle is within a predetermined distance from a branch point on a route found by the route search unit and outputs the branch-point image data to the display unit so that a present-position mark is superimposed on the branch-point image data on the basis of the coordinates of the present position detected by the present-position detecting unit and the coordinates added to the branch-point image data.

The present-position mark may be displayed so as to move according to the distance from the vehicle to the branch point.

Preferably, the image data has a flag indicating whether or not the image data has coordinates added thereto according to the distance from a branch point such as an intersection.

Preferably, the image data includes data concerning the size thereof when it is expanded, and has a coordinate offset from a specific coordinate point to a display reference point.

In addition, the present invention provides a storage medium having a program including the step of detecting a present position and the step of storing data necessary for route guidance. The data includes branch-point image data having coordinates added thereto according to the distance from a branch point such as an intersection. The program further includes the step of searching for a route and displaying route guidance information, and the step of comparing the coordinates of the detected present position with the coordinates added to the branch-point image data when the present position is within a predetermined distance from a branch point on a route found by the searching step, and displaying a present-position mark superimposed on the branch-point image data.

In addition, the present invention provides a storage medium containing branch-point image data having coordinates added thereto according to the distance from a branch point such as an intersection and further having data concerning the size of the image data when it is expanded and a coordinate offset from a specific coordinate point to a display reference point.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

An embodiment of the present invention will be described below with reference to the accompanying drawings.

Figure 1:
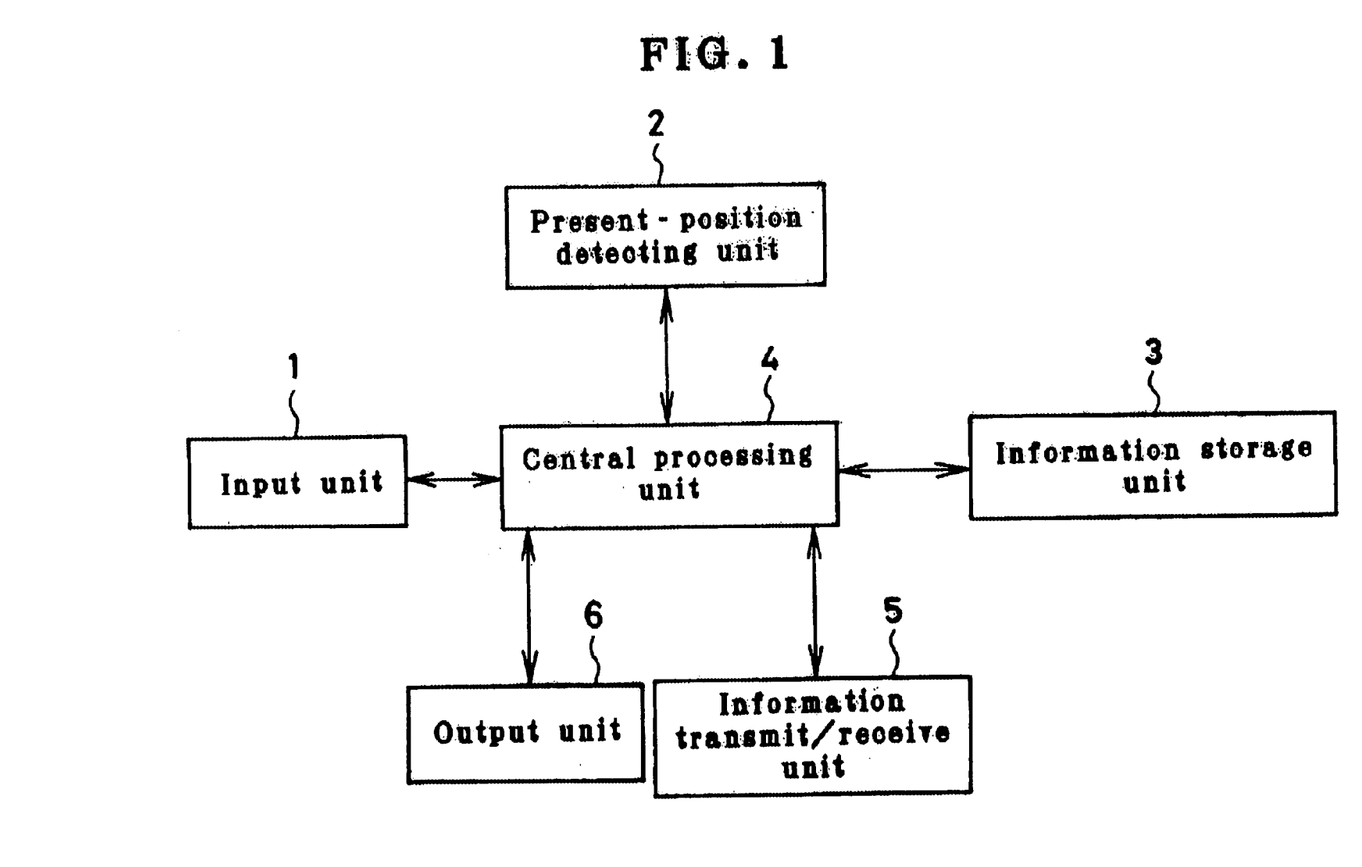
FIG. 1 is a block diagram showing a structural example of the navigation system for vehicles according to the present invention.

FIG. 1 is a block diagram showing a structural example of the navigation system according to the present invention.

The navigation system includes the following units. An input unit 1 is used to enter information relating to route guidance. A present-position detecting unit 2 detects information relating to the present position of a vehicle equipped with this navigation system. An information storage unit 3 contains the record of navigation data necessary for route calculation, display/voice guidance data necessary for route guidance, programs (applications and/or an OS), and so forth. A central processing unit 4 executes route finding processing, display/voice guidance processing necessary for route guidance, and control of the overall system. An information transmit/receive unit 5 transmits and receives information relating to driving of vehicles, e.g. road information and traffic information, and detects information relating to the present position of the vehicle and further transmits and receives information relating to the present position. An output unit 6 outputs information relating to route guidance.

The input unit 1 has the functions of entering a destination and allowing the driver to instruct the central processing unit 4 to execute navigation processing at his/her own will. As devices for implementing these functions, it is possible to use a touch switch and a remote controller, e.g. a jog dial, for entering a destination in the form of a telephone number or coordinates on a map and for requesting route guidance. In the present invention, the input unit 1 further has a device for performing interaction by voice input. Thus, the input unit 1 also functions as a voice input unit. It is possible to add a record card reader for reading data recorded on an IC card or a magnetic card. It is also possible to add a data communication device for exchanging data between information sources such as an information center in which data necessary for navigation has been stored and which provides information through a communication channel upon request from the driver, and a portable electronic unit having data, e.g. map data, destination data, simplified map data, and structure-shape map data.

The present-position detecting unit 2 includes a device that obtains information concerning the present position of the vehicle by utilizing a global positioning system (GPS). The present-position detecting unit 2 further includes an absolute heading sensor for sensing the vehicle heading direction in terms of an absolute bearing by utilizing geomagnetism, for example, a relative heading sensor for sensing the heading direction of the vehicle in terms of a relative bearing by utilizing, for example, a steering sensor or a gyro sensor, and a distance sensor for sensing the distance traveled by the vehicle from the number of revolutions of a wheel, for example.

The information storage unit 3 is an external storage unit in which programs and data for navigation have been stored, for example, a CD-ROM. The information storage unit 3 stores programs for executing processing such as route finding processing, programs for executing processing shown in the flowchart stated in this embodiment, programs for executing display-output control necessary for route guidance and for executing interactive guidance by voice input, together with data necessary therefor, and programs for executing voice output control necessary for voice guidance, together with data necessary therefor. The information storage unit 3 stores all data necessary for the navigation system. The data comprises files such as map data, search data, guidance data, map matching data, destination data, registered-location data, road data, image data concerning branch points, e.g. intersections, data classified by genre, and landmark data. It should be noted that the present invention is also applicable to a type in which only data is stored in a CD-ROM and programs are stored in a central processing unit.

The central processing unit 4 includes a CPU for executing various kinds of arithmetic processing; a flash memory for storing a program read out of the CD-ROM of the information storage unit 3; a ROM containing a program for executing program check for the flash memory and a program for executing update processing (i.e. program read means); and a RAM for temporarily storing the location coordinates of a set destination, guidance information for a found route, such as the code number of a road, and data which is in the course of being processed. Although not shown in the figure, the central processing unit 4 further has the following devices: a speech processor which executes interactive processing by voice input from the input unit 1 and which, on the basis of a voice-output control signal from the CPU, combines voice, phrases, single sentences and sounds read out of the information storage unit 3, converts the result to an analog signal and delivers it to a speaker; a communication interface for performing an exchange of input/output data by communication; a sensor-input interface for inputting sensor signals from the present-position detecting unit 2; and a clock for entering date and time into internal dialog information. It should be noted that the above-described program for executing update processing may be stored in an external storage unit.

The programs related to the present invention and the other programs for carrying out navigation may be all stored in a CD-ROM as an external storage medium. Alternatively, some or all of the programs may be stored in the ROM provided in the central processing unit 4 of the navigation system. The data and programs stored in the external storage medium are input as external signals to the central processing unit 4 of the navigation system and subjected to arithmetic processing, thereby allowing various navigation functions to be implemented.

As has been stated above, the navigation system according to the present invention contains a flash memory of relatively large capacity for reading in a program from a CD-ROM as an external storage device, and a ROM of small capacity for storing a program (program read means) for CD boot-up processing. The flash memory is a non-volatile storage device, in which stored information is retained even when the power supply is cut off. As CD boot-up processing, the program in the ROM, which is a program read means, is started to check the program stored in the flash memory, and disk management information in the CD-ROM as the information storage unit 3 is read in. Program loading processing (update processing) is executed by judging the disk management information and the state of the flash memory.

The information transmit/receive unit 5 comprises a GPS receiver for obtaining information by utilizing a global positioning system (GPS), a VICS information receiver for obtaining information by using FM multiplex data broadcasting, a radio beacon, a light beacon, etc., a data transceiver for bidirectionally communicating information with an information center (e.g. ATIS) or other vehicles by using, for example, a cellular phone or a personal computer, etc.

The output unit 6 has the functions of outputting guidance information by voice and/or a screen display when required by the driver and printing out data for navigation processed in the central processing unit 4. As devices for implementing these functions, the output unit 6 has a display for displaying route guidance on a screen, a printer for printing out data processed by the central processing unit 4 and data stored in the information storage unit 3, and a speaker for outputting route guidance by voice.

The display is a simple liquid-crystal display device or the like. On the basis of map data and guidance data processed by the central processing unit 4, the display device displays a screen of an enlarged view of an intersection, the name of a destination, time, distance, arrows indicating a heading direction, etc. Because image data sent to the display is binary image data (bit map data), it is not always necessary to use a special-purpose image signal line but possible to use a communication line used for serial communications or to share the use of other communication lines. It should be noted that the display has a memory for temporarily holding bit map data.

The display is provided inside the instrument panel in the vicinity of the driver's seat. Viewing the display enables the driver to ascertain the present location of the vehicle and to obtain information regarding a route from this location. Although not shown in the figure, the arrangement may be such that a data tablet including a touch panel, a touch screen, etc. is used for the display screen to allow a location, a road, etc. to be entered by touching the screen or tracing over it.

Figure 2:
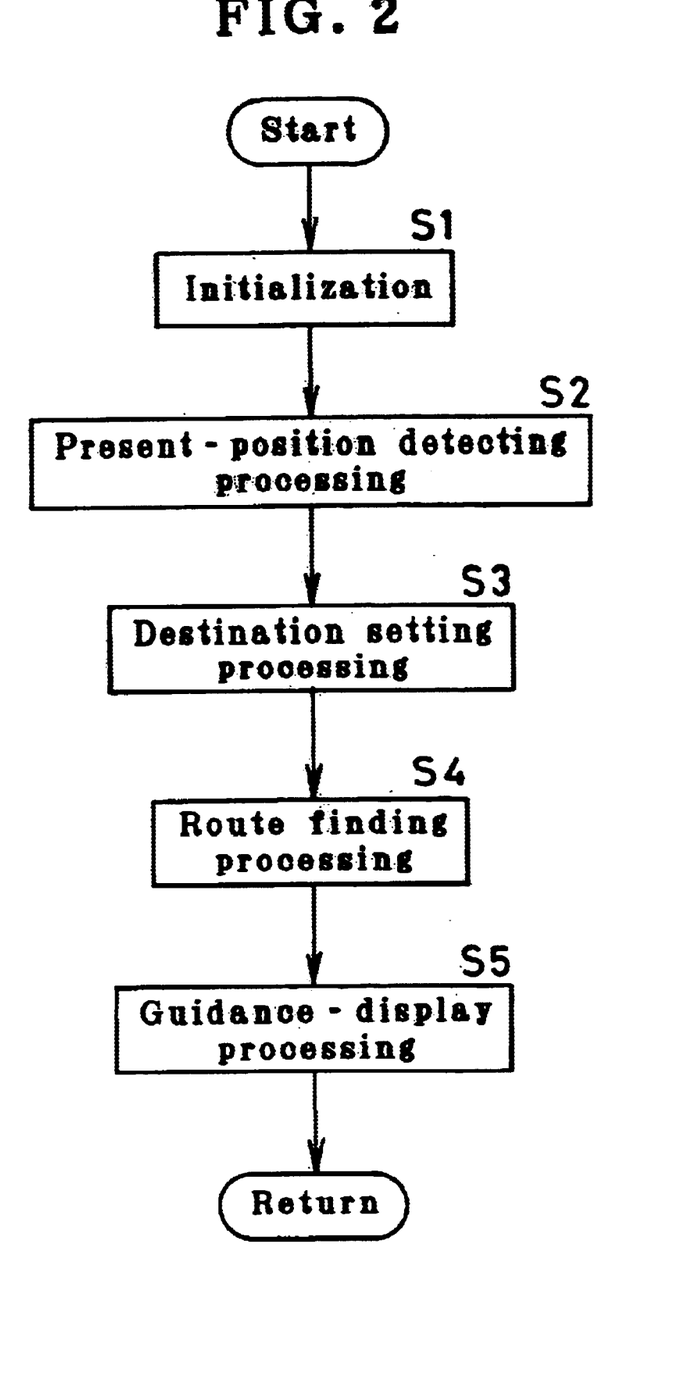
FIG. 2 is a flowchart for describing the flow of processing in the overall navigation system according to the present invention.

FIG. 2 is a flowchart for describing the flow of processing in the overall navigation system according to the present invention.

When the route guidance program is read into the central processing unit 4 from the information storage unit 3 and started (step S1), the present position is detected by the present-position detecting unit 2, and a map of surroundings centered on the present position is displayed, and further the name of the present position and so forth are displayed (step S2). Next, the destination is set (step S3) by using the name of a target object, e.g. a place name or a facility name, a telephone number, an address, a registered location, a road name, etc. Then, a route search is executed to find a route from the present position to the destination (step S4). When the route has been decided, route guidance and display are performed repeatedly (step S5) until the destination is reached while the present position is followed up by the present-position detecting unit 2. If there is entry of en-route setting before the destination is reached, a search area is set, and re-search is executed in the set search area. In this way, route guidance is similarly performed repeatedly until the destination is reached.

Figure 3:
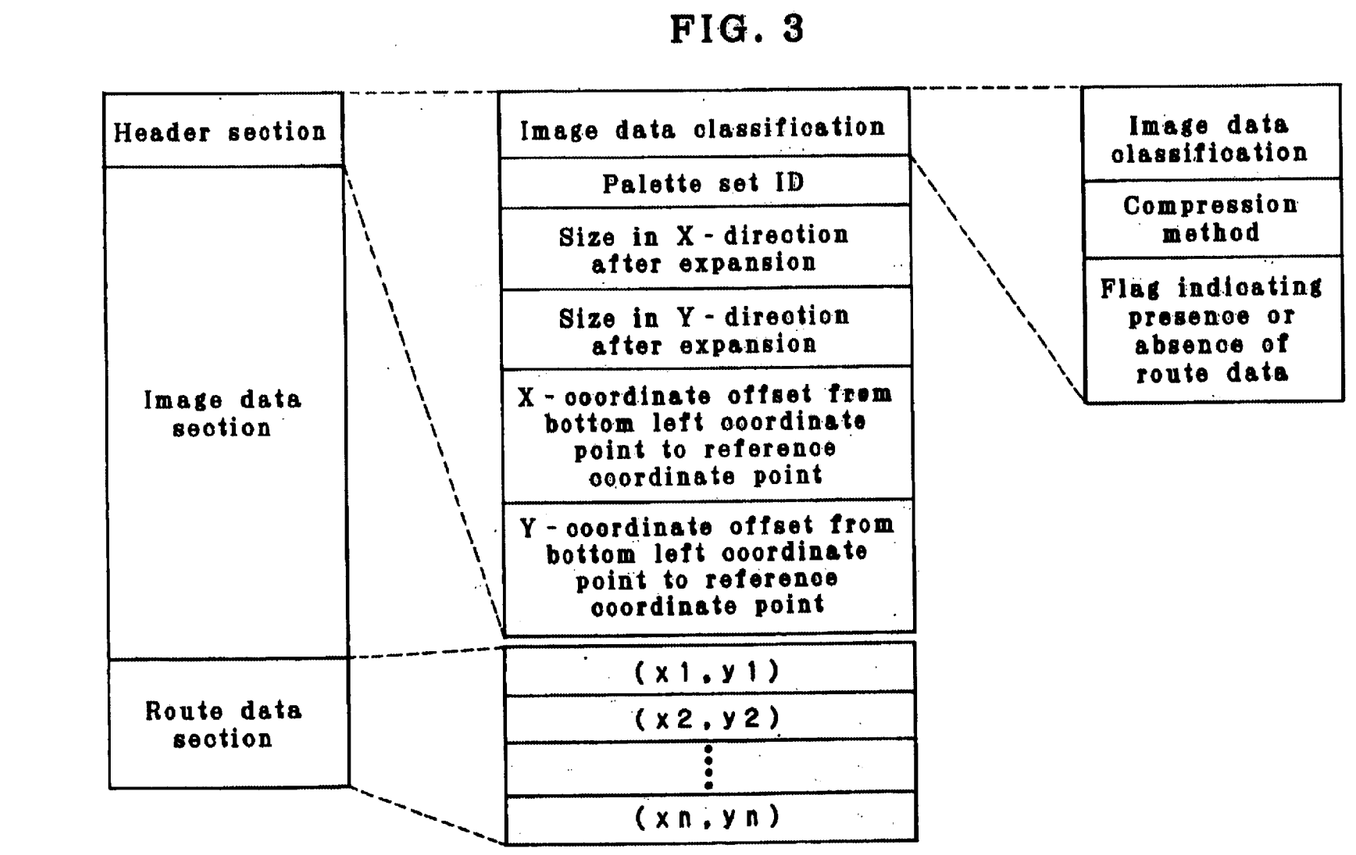
FIG. 3 is a diagram showing an example of an image data structure used in the present invention.

FIG. 3 is a diagram illustrating the structure of image data used in the present invention. Image data used to display an enlarged view of a branch point such as an intersection comprises a header section, an image data section, and a route data section. The header section contains image data classification, i.e. GIF, TIFF, and JPEG, palette set ID defining a color palette set to be used when the image data is expanded (in image drawing), sizes in X- and Y-directions when the stored image data is expanded, and X- and Y-coordinate offsets from the bottom left coordinate point of the expanded image data to a reference coordinate point (display reference point). It should be noted that the image data classification also contains an image data compression method and a flag indicating whether or not there is route data. The route data section contains position coordinate data concerning some points on a route in the form of coordinates with respect to the bottom left coordinate point of the image data.

Figure 4:
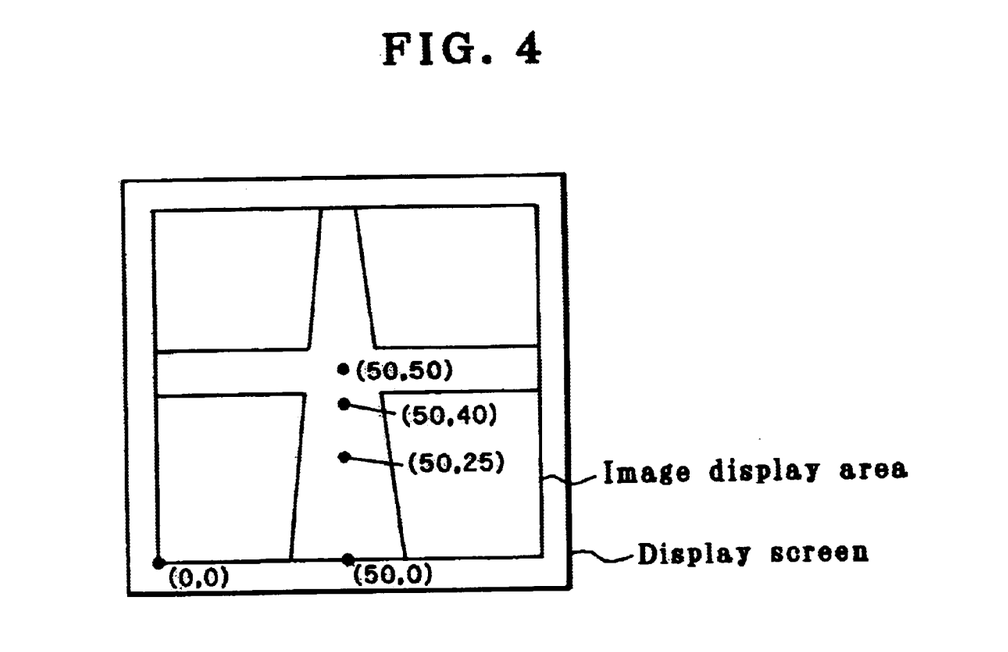
FIG. 4 is a diagram for describing image data having position coordinates added thereto.
Figure 5:
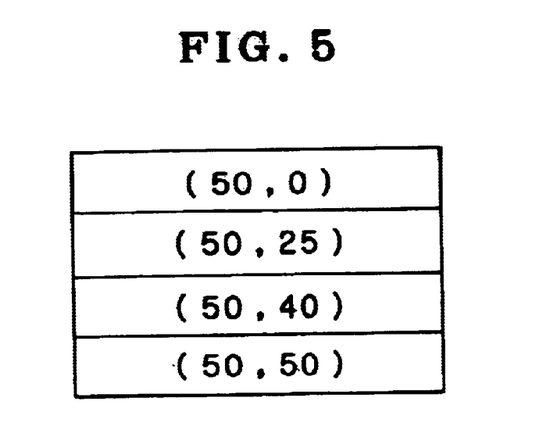
FIG. 5 is a diagram showing a route data section.

The route data section will be described below by way of an example shown in FIGS. 4 and 5. When the size of image data is 100 dots by 100 dots (the size in the X-direction after expansion is 100 dots and the size in the Y-direction after expansion is 100 dots), as shown for example in FIG. 4, an enlarged view drawn by using the image data is displayed in the image display area, and position coordinates of 4 points are added to the route with respect to the bottom left coordinate point (0, 0). In this case, as shown in FIG. 5, coordinate data items (50, 0), (50, 25), (50, 40) and (50, 50) are stored in the route data section.

In the present invention, a present-position mark is displayed on an enlarged view of an image displayed by image data by using the coordinates added to the image data.

Figure 6A:
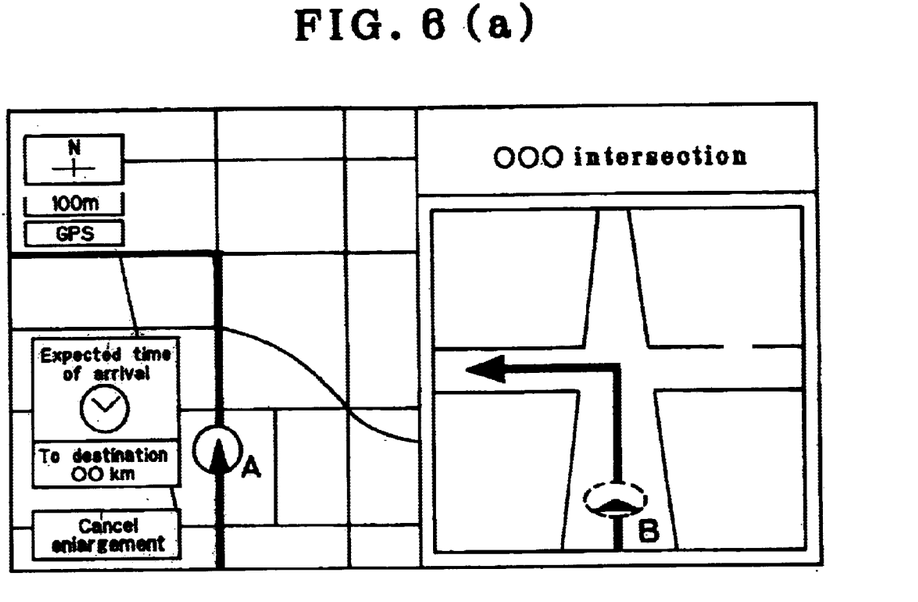
FIGS. 6(a)–6(b) are diagrams showing a display example of an enlarged view of an intersection image displayed by using image data.
Figure 6B:
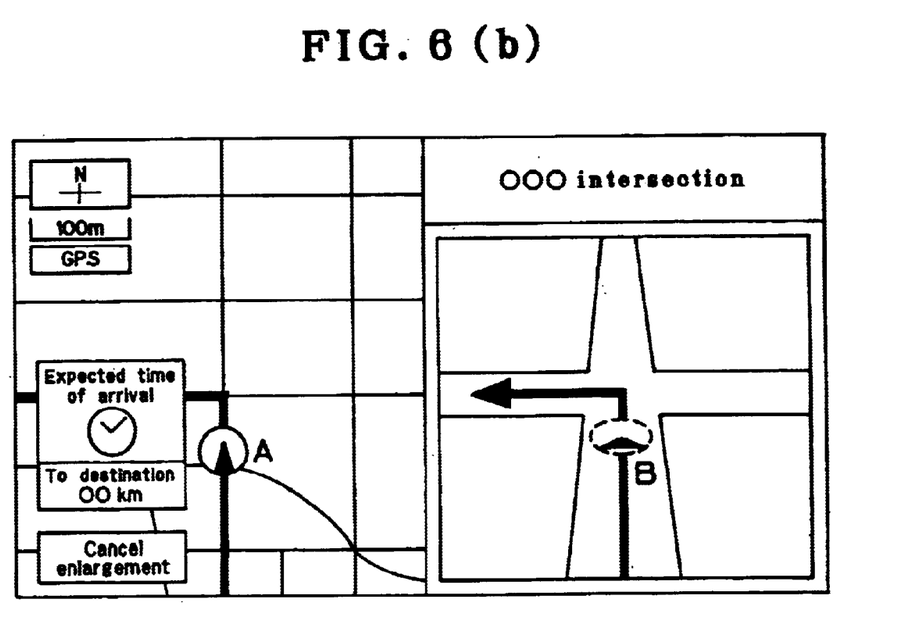

As shown in part (a) of FIG. 6, on the left-hand part of a two-part split screen, a present-position mark A is displayed, together with a suggested route, on a map prepared from node data. On the right-hand part of the screen, an enlarged view of an intersection at which the driver should turn is displayed by using image data. By comparing the detected present position with the position coordinate data in the route data section shown in FIGS. 4 and 5, the present position on the image data is located, and a present-position mark B is displayed superimposed on the image data, together with an arrow indicating a direction in which the driver should turn. As the vehicle travels, as shown in part (b) of FIG. 6, the present-position mark B displayed on the image data moves in synchronism with the present-position mark A.

Figure 7A:
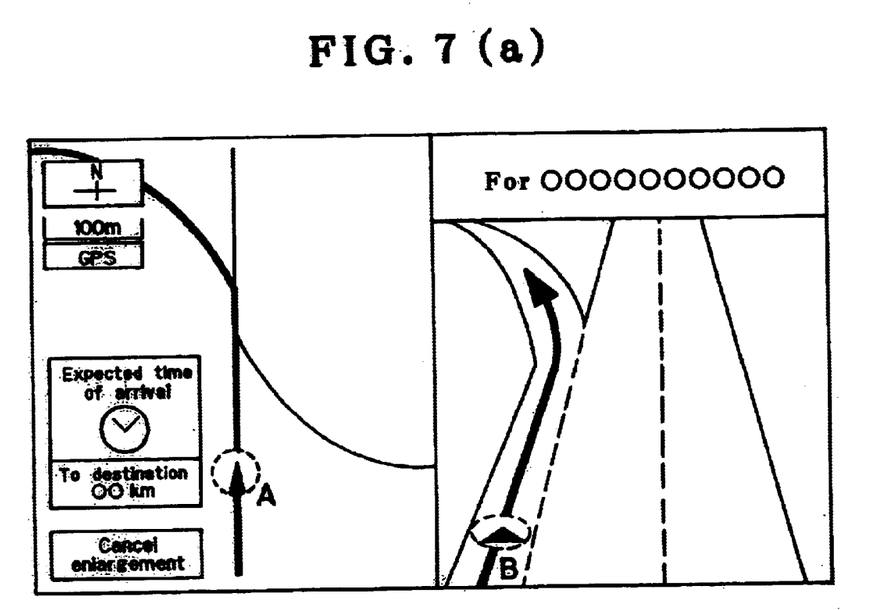
FIGS. 7(a)–7(b) are diagrams showing a display example of an enlarged view of a branch point image displayed by using image data.
Figure 7B:
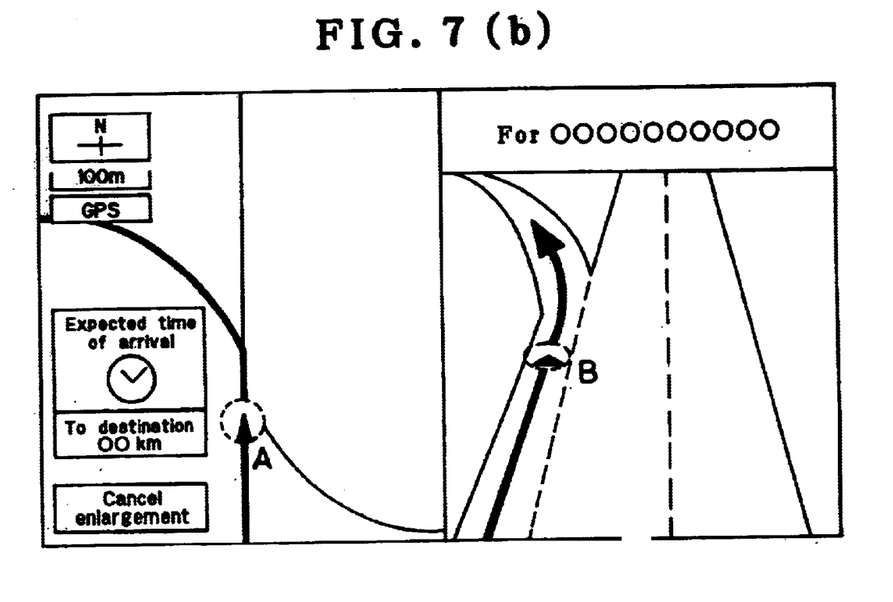

FIG. 7 shows an example in which an enlarged view of a branch point is displayed as image data. In part (a) of FIG. 7, the present position on the image data is located by a comparison between the position coordinate data in the route data section and the present-position data, and a present-position mark B is displayed superimposed on the image data. As shown in part (b) of FIG. 7, the present-position mark B displayed on the image data moves as the vehicle travels.

Figure 8:
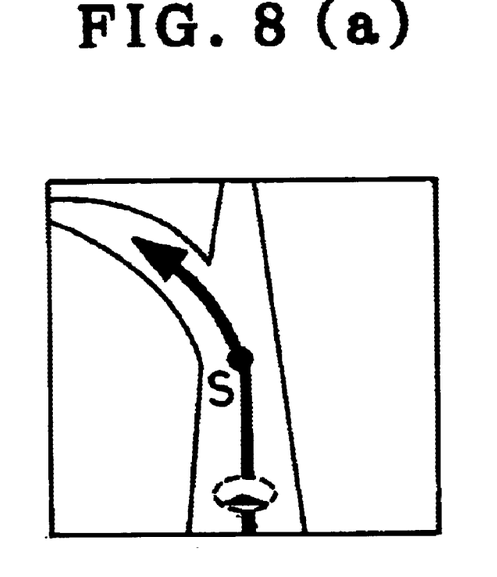
FIGS. 8(a)–8(b) are diagrams showing an example of the X-coordinate offset from the bottom left coordinate point of image data to a display reference point.

FIG. 8 shows an example of the X-coordinate offset from the bottom left coordinate point of image data to a reference coordinate point (display reference point). When an enlarged view of a branch point or an intersection is displayed by using image data, if the image data is expanded by setting a display reference point S in the center of the image data, as shown in part (a) of FIG. 8, an unfavorably large space may be produced on the right-hand side. In such a case, as shown in part (b) of FIG. 8, the display reference point is shifted leftward to adjust the X-coordinate offset from the bottom left coordinate point to the display reference point, thereby allowing the image data to be expanded at an appropriate position. This is equally true of the Y-coordinate offset.

As has been stated above, according to the present invention, coordinates are added to image data according to the distance from a branch point such as an intersection, and a present-position mark is displayed superimposed on the image data on the basis of the coordinates added to the image data and the coordinates of the detected present position. The present-position mark displayed on the image data can be moved according to the distance from the branch point. Accordingly, it becomes possible to guide the vehicle reliably at an intersection or a branch point on a suggested route where the driver should turn.

It should be noted that the present invention is not limited to the foregoing embodiment but can be modified in a variety of ways.

What is claimed is:

1. A navigation system comprising:

present-position detecting means for detecting a present position of a vehicle;

input means for entering a destination and information;

information storage means for storing data, said data including branch-point image data having coordinates added thereto according to a distance from a branch point, and road data, said data also including node data;

display means for displaying route guidance information;

route search means for searching for a route to the destination on a basis of the information entered by said input means and the data stored in said information storage means;

control means reading said branch-point image data when the vehicle is within a predetermined distance from a branch point on a route found by said route search means and outputting said branch-point image data to said display means to display a present-position mark superimposed on said branch-point image data on a basis of coordinates of the present position detected by said present-position detecting means and the coordinates added to said branch-point image data; and said control means reading said node data and outputting said node data to said display means so that a map prepared according to the node data is displayed.

2. A navigation system according to claim 1, wherein the present-position mark is displayed so as to move according to a distance from the vehicle to the branch point.

3. A navigation system according to claim 1, wherein said image data has a flag indicating whether or not said image data has coordinates added thereto according to a distance from a branch point such as an intersection.

4. A navigation system according to claim 1, wherein said image data includes data concerning a size thereof when it is expanded, and has a coordinate offset from a specific coordinate point to a display reference point.

5. A storage medium having a program comprising the steps of:

detecting a present position;

storing data necessary for route guidance, said data including branch-point image data having coordinates added thereto according to a distance from a branch point and said data including node data;

searching for a route and displaying route guidance information;

comparing coordinates of the detected present position with the coordinates added to said branch-point image data when the present position is within a predetermined distance from a branch point on a route found by said searching step, and displaying a present-position mark superimposed on said branch point-image data; and reading said node data and displaying a map prepared according to the node data.

6. A storage medium comprising:

branch-point image data having coordinates added thereto according to a distance from a branch point; and wherein said image data includes data concerning a size thereof when it is expanded, and has a coordinate offset from a specific coordinate point to a display reference point.

* * * * *